US011210859B1

(12) United States Patent
Fredericks

(10) Patent No.: US 11,210,859 B1
(45) Date of Patent: Dec. 28, 2021

(54) COMPUTER SYSTEM FOR FORENSIC ANALYSIS USING MOTION VIDEO

(71) Applicant: Occam Video Solutions, LLC, Spokane, WA (US)

(72) Inventor: Andrew Thomas Fredericks, Spokane, WA (US)

(73) Assignee: Occam Video Solutions, LLC, Spokane, WA (US)

( * ) Notice: Subject to any disclaimer, the term of this patent is extended or adjusted under 35 U.S.C. 154(b) by 0 days.

(21) Appl. No.: 16/700,249

(22) Filed: Dec. 2, 2019

Related U.S. Application Data

(60) Provisional application No. 62/774,808, filed on Dec. 3, 2018.

(51) Int. Cl.
*G06T 19/00* (2011.01)
*G06T 5/00* (2006.01)

(52) U.S. Cl.
CPC ............ *G06T 19/006* (2013.01); *G06T 5/006* (2013.01); *G06T 2200/24* (2013.01); *G06T 2207/10016* (2013.01)

(58) Field of Classification Search
None
See application file for complete search history.

(56) References Cited

U.S. PATENT DOCUMENTS

| 5,617,114 A | 4/1997 | Bier et al. | |
| 2008/0291279 A1* | 11/2008 | Samarasekera | ........ H04N 7/181 348/159 |
| 2017/0064208 A1* | 3/2017 | Salimpour | ............ G06T 1/0007 |
| 2020/0126299 A1* | 4/2020 | Bosch | ........................ G06T 7/80 |
| 2020/0273205 A1* | 8/2020 | Yamashita | ............. H04N 17/00 |

FOREIGN PATENT DOCUMENTS

JP         2018106661       *  7/2018

OTHER PUBLICATIONS

Albarelli, Andrea, et al., "On the Interplay between Data Overlay and Real-World Context using See-through Displays," CHItaly 2015: Proceedings of the 11th Biannual Conference on Italian SIGCHI Chapter, Sep. 2015, pp. 58-65.
Aubry, Mathieu, et al., "Painting-to-3D Model Alignment via Discriminative Visual Elements", ACM Transactions on Graphics, vol. 33, Issue 2, Apr. 2014, Article No. 14.
Hugemann, Wolfgang, "Correcting Lens Distortions in Digital Photographs", 2010, available from http://www.imagemagick.org/Usage/lens/correcting_lens_distortions.pdf.

(Continued)

*Primary Examiner* — Nurun N Flora

(57) ABSTRACT

A computer system calibrates an image from digital motion video, which originated from a camera that has a view of a scene from a period of time, with an image rendered from a three-dimensional model of the scene for a view based on a location (position and orientation) of the camera in the scene. The calibrated image from the digital motion video can be overlaid on the rendered image in a graphical user interface. The graphical user interface can allow a user to modify opacity of the overlay of the calibrated image from the digital motion video on the rendered image. The overlaid image can be used as a guide by the user to provide inputs with respect to the three-dimensional model.

17 Claims, 10 Drawing Sheets

(56) References Cited

OTHER PUBLICATIONS

Karnik, Abhijit, et al., "PiVOT: Personalized View-Overlays for Tabletops", UIST '12: Proceedings of the 25th annual ACM symposium on User interface software and technology, Oct. 2012, pp. 271-280.
Lee, Seok-Han, et al., "Lens Distortion Correction using a Checkerboard Pattern", VRCAI '08: Proceedings of The 7th ACM SIGGRAPH International Conference on Virtual-Reality Continuum and Its Applications in Industry, Dec. 2008, Article No. 44, pp. 1-2.
McKeown, Jr., David M., et al., "Graphical Tools for Interactive Image Interpretation", Computer Graphics, vol. 16, No. 3, Jul. 1982, pp. 189-198.
Schaefer, Scott, et al., "Image Deformation Using Moving Least Squares", SIGGRAPH '06: ACM SIGGRAPH 2006 Papers, Jul. 2006, pp. 533-540.
Zorin, Denis, et al., "Correction of Geometric Perceptual Distortions in Pictures", SIGGRAPH '95: Proceedings of the 22nd annual conference on Computer graphics and interactive techniques, Sep. 1995, pp. 257-264.

\* cited by examiner

COMPUTER SYSTEM FOR FORENSIC ANALYSIS USING MOTION VIDEO

CROSS-REFERENCE TO RELATED APPLICATIONS

This application is a non-provisional application of U.S. Provisional Patent Application Ser. No. 62/774,808, filed Dec. 3, 2018, entitled "Computer System for Forensic Analysis Using Motion Video", which is hereby incorporated by reference.

BACKGROUND

Motion video is a common source of evidence of incidents such as traffic accidents and criminal activity. A variety of information can be gleaned from motion video through image processing, such as position, speed, acceleration, and relative position of objects. Each image in motion video only provides two spatial dimensions of information. Motion video also provides a temporal dimension, allowing additional information to be extracted by analyzing multiple images. However, the information that can be extracted is limited by what was actually visible to the camera or cameras.

Another source of evidence can be a computer-based three-dimensional model of a scene. Such a three-dimensional model, when presented using three-dimensional modeling, rendering, and animation software on a computer, allows a user to visualize different areas of a scene, measure distances, and determine relative positions of objects, and so on. However, in the context of forensic analysis of incidents such as traffic accidents and criminal activity, such three-dimensional models generally do not include evidence about pertinent objects that were present during an incident of interest. For example, a witness at a scene of a vehicle accident may recall something visible from their perspective at the time of the accident. Because any three-dimensional model of the scene of the accident would be prepared at a time other than the time of the accident, the witness would not be present in that model. To illustrate a view from the location of the witness poses challenges in pinpointing the witness location in the scene. To provide reliable evidence based on the witness' location in the three-dimensional model, based on an approximation of what the witness could see, involves defining a margin of error.

SUMMARY

This Summary is provided to introduce a selection of concepts in a simplified form that are further described below in the Detailed Description. This Summary is intended neither to identify key or essential features, nor to limit the scope, of the claimed subject matter.

A computer system calibrates an image from digital motion video, which originated from a camera that has a view of a scene from a period of time, with an image rendered from a three-dimensional model of the scene for a view based on a location (position and orientation) of the camera in the scene. The calibrated image from the digital motion video can be overlaid on the rendered image in a graphical user interface. The graphical user interface can allow a user to modify opacity of the overlay of the calibrated image from the digital motion video on the rendered image. The overlaid image can be used as a guide by the user to provide inputs with respect to the three-dimensional model.

Further manipulations of the three-dimensional model, such as selecting points, from which measurements can be made or for adding and positioning models of objects, can be guided by the information provided by the overlay. For example, a vehicle may be present in the calibrated image but not in the three-dimensional model. Given the overlaid, calibrated image, a user can select points, through an input device, based on the visual guidance provided by the overlaid image. The inputs from the input device are passed, however, to the application supporting the three-dimensional model. This application uses these inputs as if the overlaid image is not present, in effect allowing the user to select a location in the three-dimensional model using the overlaid image as a guide. The inputs passed to the application can be used for any purpose the three-dimensional modeling or animation application supports.

While one of the applications described herein is forensic analysis, these techniques are applicable to any other application in which information from an image or video may be useful to guide inputs to a three-dimensional model. Such applications include but are not limited to historical reconstructions, real estate, interior design, architectural design, game design, animation, motion-pictures, and other applications of three-dimensional modeling and animation. An overlaid image can be paired with any other application to allow a user to use the image as a guide for providing inputs to the underlying application.

In the following description, reference is made to the accompanying drawings which form a part hereof, and in which are shown, by way of illustration, specific example implementations. Other implementations may be made without departing from the scope of the disclosure.

DETAILED DESCRIPTION

As used herein a digital still image is made using a camera, in which light is captured by a light-sensitive device, such as a charge-coupled device (CCD), to generate a two-dimensional image on the device. The camera may include a lens to focus the light onto the light-sensitive device. This image in turn is output by the device and digitally stored as an N by M array (where N and M are positive integers) of picture elements, called pixels. The image can be called a frame. Each pixel is represented by data representing one or more color components. "Digital motion video" is a time-based series of frames, with each frame stored as a digital still image. A digital still image can be stored in an uncompressed form or in a compressed form.

A "three-dimensional model" comprises digital data on a computer representing, in three spatial dimensions, a plurality of objects in those three spatial dimensions. Such an object can be defined by a plurality of vertices and edges between those vertices, or by data specifying one or more surfaces in three dimensions, or by sample data representing points in three dimensions, or any other technique specifying an object in three dimensions. Such an object also may have a specified position and orientation in three spatial dimensions. An object may be associated with texture data applied to a surface. An animation of a three-dimensional model includes any data that specifies how the data representing an object may change over time.

Figure 1:
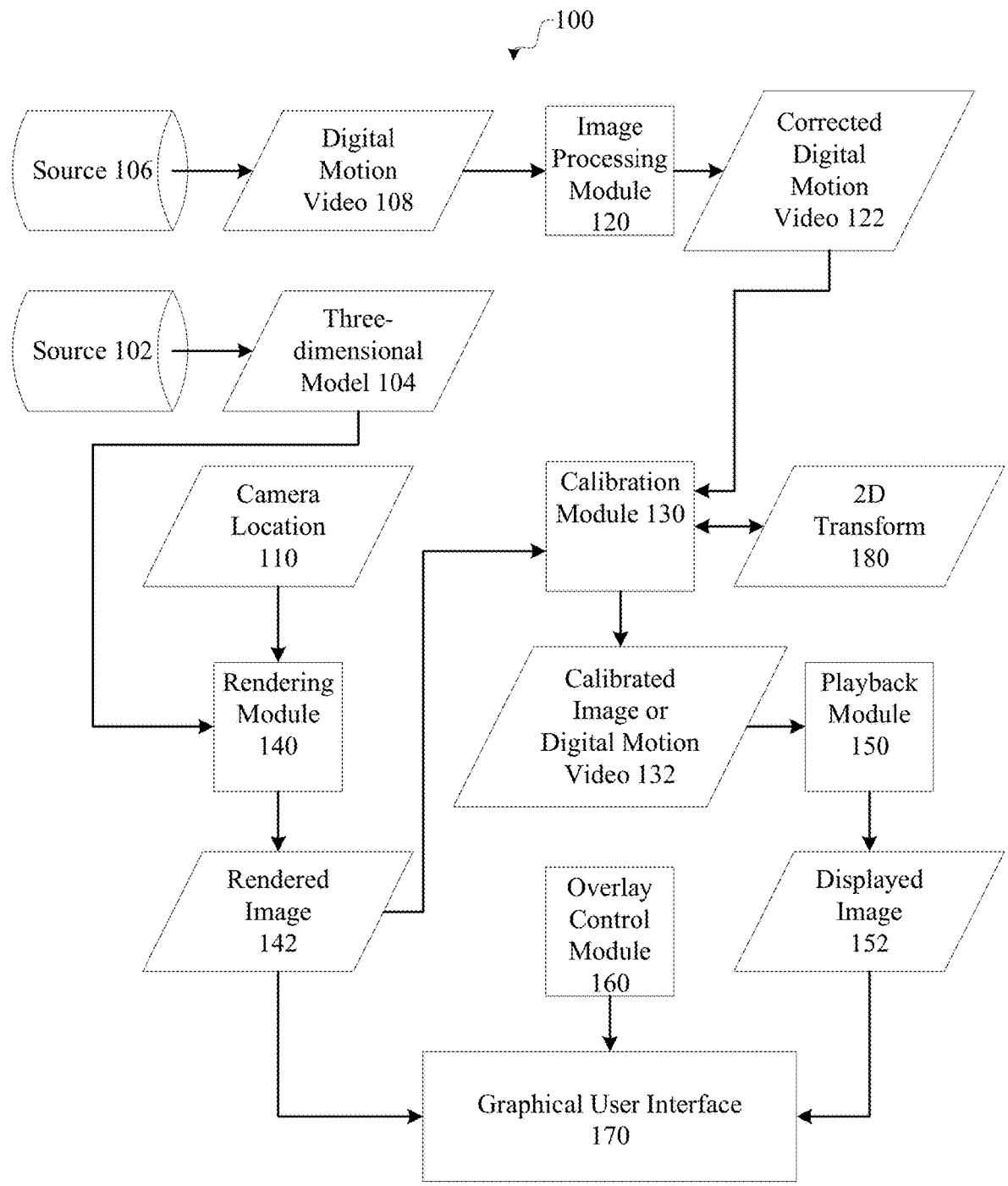
FIG. 1 is a data flow diagram of an illustrative example implementation of a computer system incorporating three-dimensional models and motion video from a camera.

FIG. 1 is a data flow diagram of an example implementation of a computer system 100 that combines digital motion video from a camera with a three-dimensional model of a scene within the view of the camera.

Such a computer system 100 includes a source 102 of data representing a three-dimensional model 104 of a scene, and a source 106 of digital motion video 108 which originated from a camera that has a view of the scene and which is from a period of time. The three-dimensional model 104 of the scene includes the location of the camera. Data specifying the location (position and orientation) 110 of the camera in the three-dimensional model also is determined. The three-dimensional model 104 and the digital motion video 108 can be stored as data files on computer storage.

The source 102 of the data representing the three-dimensional model can be any of a variety of tools that provide such data. For example, three-dimensional laser scanning technology, currently available from FARO Technologies, Inc., of Lake Mary, Fla., and Leica Geosystems, Inc., of Norcross, Ga., can be used to capture highly accurate three-dimensional measurements of a scene, from which a three-dimensional model can be generated. As another example, images can be captured using a camera, such as a camera mounted to a mobile robot or autonomous flying vehicle (drone), from which a point cloud in three dimensions is generated. The Pix4D family of software products from Pix4D, S.A., of Switzerland can be used for this purpose, for example. As another example, an architectural or engineering model generated by computer-aided design software, such as the AUTOCAD product from Autodesk, Inc, can be used to provide a three-dimensional model of a scene or of an object. As another example, an object model and animation generated by computer-aided modeling and animation software, such as the MAYA product from Autodesk, Inc, can be used to provide a three-dimensional model of a scene or of an object. The invention is not limited to a particular kind of software for generating a three-dimensional model of the scene.

In practice, for forensic analysis, the entity performing the forensic analysis may use a tool to acquire or generate the three-dimensional model and may use computer software that can process the three-dimensional model to render images based on the three-dimensional model.

The source 106 of digital motion video can be any data storage system that stores digital motion video originating from a camera that has a view of a scene. The digital motion video can be provided in any of a variety of color formats (i.e., bits per pixel and color components used), spatial resolutions (i.e., image size in n pixels by m pixels), and temporal resolutions (i.e., frame rate or number of frames per second). The term "color format" is intended to include both black and white images and color images. The digital motion video can include images from different cameras which are multiplexed into a single stream of images. The digital motion video can have associated audio. The digital motion video can originate from motion video captured in an analog format, which is then converted to digital format. While the description refers to motion video, these techniques also can be applied to any still image of a location.

In practice, for forensic analysis, the camera at a scene, and digital motion video originating and stored from it, are controlled by a third party who provides access to the digital motion video to the entity performing the forensic analysis. Generally, the digital motion video is provided as a data file on computer readable storage. The entity performing forensic analysis also may have another party create an initial three-dimensional model of a scene. Notably, the digital motion video from the camera at the scene and the three-dimensional model of the scene thus can be created at different times and under the control of different entities. The sources 106 and 102 of this information can be "cloud" storage or other storage accessible over a wide area or local area computer network. The digital motion video and three-dimensional model can be uploaded to such storage by entities that created them.

In most cases, the lens of the camera may introduce distortion in the image. In some implementations of this computer system, the computer system can include an image processing module 120 that removes lens distortion. Other types of distortions may exist, and the image processing module 120 also may be programmed to remove these other types of distortion. For example, the camera may be inside a housing and the material of the housing may introduce distortion. For example, many cameras for security systems have a housing with transparent material between the camera lens and its surroundings. This transparent material may introduce distortion. The image processing module 120 has an input that receives one or more images from the digital motion video and provides corrected digital motion video 122 as an output. An example implementation of lens distortion correction will be described in more detail below.

The corrected digital motion video may no longer be a rectangular image due to the correction. A cropping operation can be performed on the corrected digital motion video, or a selected image from it, to make one or more corrected images rectangular. The cropping operation can be automatically or manually performed. Such cropping can be performed after the corrected digital motion video is calibrated to an image rendered using the three-dimensional model.

The corrected digital motion video 122, or a selected image from it, is calibrated with the three-dimensional model 104 based on the camera location (position and orientation) 110 using a calibration module 130. The calibration module 130 uses an image 142 generated by rendering the three-dimensional model 104 from the viewpoint of the camera location 110. The calibration module uses correspondence points (not shown, but described in more detail below in connection with FIG. 4), to align the digital motion video 122 with the rendered image 142 of the three-dimensional model. The user starts by specifying a viewpoint, having a position, orientation, and depth of view, in the three-dimensional model that corresponds to the camera location 110. In one implementation, the calibration results in a two-dimensional transform 180 applied to digital motion video to conform it to the viewpoint. When the two-dimensional transform is applied to an image from the corrected digital motion video, the result is an image that is matched in perspective, orientation, or alignment, with the view from the three-dimensional model.

Generally, for forensic applications, a single image from a clip of digital motion video is selected from the clip and used to perform calibration. A user-selected image or an arbitrarily selected image can be used, but the computer system can be programmed to simply select the first image of the clip. After calibration parameters are established, each image from the clip can be processed to calibrate each image. The calibration parameters can be applied to other clips originating from the same camera for clips recorded under similar conditions.

The output resulting from application of the calibration module 130 is a spatially aligned pair of a calibrated image 132 from the corrected digital motion video 122 with the rendered image 142 from rendering the three-dimensional model 104 from the viewpoint of the camera location 110. The system can output the 2D transform 180 and the corrected digital motion video 122. Given the transform 180, corrected video 122, camera location (position and orientation) 110 and three-dimensional model 104, any other computer program implementing such functionality can generate and display a calibrated image 132 and rendered image 142 for display.

Given the calibrated digital motion video and the rendered image of the three-dimensional model of the scene, a calibrated image 152 from the digital motion video can be overlaid on the rendered image 142 in a graphical user interface. The graphical user interface can allow a user to modify opacity of the overlay of the digital motion video on the rendered image. In the example implementation shown in FIG. 1, the computer system includes a rendering module 140 which receives the three-dimensional model 104 and the camera location 110 as an input and renders an image 142 of the three-dimensional model in a first display area (not shown in FIG. 1). A playback module 150 receives the calibrated digital motion video and displays one or more images 152 in a second display area (not shown in FIG. 1). The playback module can have associated playback controls to play, pause, scan forward and backward, and stop display of the calibrated digital motion video in the second display area. See FIG. 5 below for an example of overlaid images and associated controls.

Given the displayed image 152 from the calibrated digital motion video and the rendered image 142 of the three-dimensional model, inputs from an overlay control module 160 allow a graphical user interface 170 to display the calibrated image 152 overlaid on the rendered image 142 with a specified amount of opacity. The overlay control module, in response to user inputs to the overlay control module, sets an opacity for the overlay of the calibrated image 152 over the rendered image 142. The graphical user interface can receive user inputs to move the image 152 within the graphical user interface to position it over the rendered image 142 of the three-dimensional model. While these overlaid images are displayed, the displayed image 152 may be updated to a different calibrated image from the digital motion video based on user inputs to the playback module. Also, other user inputs can be provided to the rendering module 140, or the three-dimensional modeling or animation software incorporating it, to perform additional operations within that software.

There are several ways in which the overlay control module 160 can be implemented.

In some implementations, the rendering module 140 is part of three-dimensional modeling or animation software, and the playback module 150 is a separate computer program that displays an image in its own display area. The overlay control module 160 can be a program that processes inputs from the user and directs the user inputs to the appropriate computer program, such as a. to the rendering module 140 or the software of which the rendering module is a component, or b. to the playback module 150, or c. to the graphical user interface, or d. to itself to use the user inputs to change the overlay controls such as opacity.

In some implementations, the overlay control module 160 can include any one or more of the playback module 150, the calibration module 130, or the image processing module 120.

In some implementations, the rendering module and the playback module may be part of the three-dimensional modeling or animation software, and the overlay control module 160 may generate graphical user interface elements that allow a user to manipulate display controls, such as opacity of the displayed image 152, within the rendering module 140 of the three-dimensional modeling software.

In some implementations, the rendering module and the playback module may be part of digital motion video playback software, and the overlay control module may generate graphical user interface elements that allow a user to manipulate display controls, such as opacity of the displayed image 152, within the digital motion video playback software.

In some implementations the overlay control module can have two states: a first state in which inputs received from the user are processed by the overlay control module, and a second state in which inputs received from the user associated with points in the displayed calibrated image are passed through to the three-dimensional modeling or animation software. The overlay control module may have a setting allowing a user to toggle between these two states.

Figure 5:
FIG. 5 is an illustration of an example graphical user interface overlaying an image from motion video from a camera on a three-dimensional model.

In an example, illustrative implementation, on a computer with a Windows operating system, the overlay control module can be implemented as a first application having two windows, one providing controls and another providing the overlaid calibrated image (See FIG. 5). The window for the overlaid calibrated image can be implemented by setting an extended window style for the window, using the SetWindowLong* methods of the Windows operating system, to enable transparency of that window (the style currently called "WS_EX_TRANSPARENT"). This extended window style allows the window to be considered transparent and let click events pass through to windows underneath it. Using this implementation, such an overlay control module can be paired with any other application to allow a user to use the image as a guide for providing inputs to the underlying application.

While the calibrated images from the digital motion video, as overlaid on the rendered three-dimensional model, are displayed, a variety of useful operations can be performed by users, particularly for advancing forensic analysis of an incident that was captured in the digital motion video.

For example, the images in the digital motion video may have captured objects that are not present in the three-dimensional model. Using the image from the digital motion video as a guide, locations related to those objects can be identified within the reference of the three-dimensional model. Distance, location, size and other information can be extracted based on the identified corresponding points in the three-dimensional model. By allowing the user to adjust opacity while viewing the overlaid images, the user can more accurately select locations in overlaid images. By passing through the selected points from the graphical user interface directly to the three-dimensional modelling or animation software, locations within the 3D model can be selected. With such a configuration, the use of calibrated images from digital motion video to enhance selection of points in a three-dimensional model can be applied to any 3D modeling or animation program without modifying that program.

As another example, using the image from the digital motion video as a guide, a three-dimensional object, corresponding to an object in the digital motion video, can be added to the three-dimensional model. The user can adjust the size, position, and orientation of the object in the three-dimensional model. By allowing the user to adjust opacity while viewing the overlaid images, the user can more accurately orient the object in the three-dimensional model. By adding the object to the three-dimensional model, further analysis of that object, such as additional measurements, animation, viewpoints, and the like, can be performed.

Figure 2:
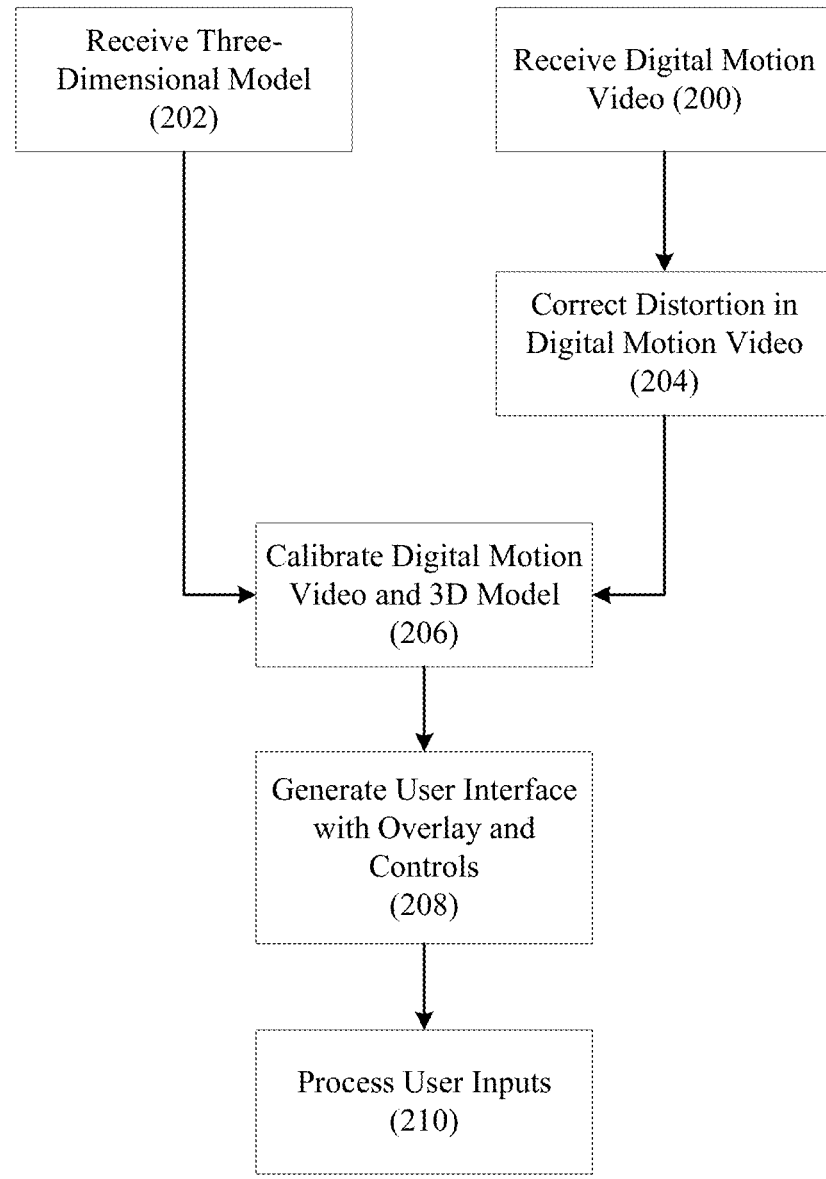
FIG. 2 is a flowchart of operation of an example implementation of a computer system such as in FIG. 1.

Turning now to FIG. 2, an example flow-of-operation using the computer system of FIG. 1 will now be described. The computer system receives (200) digital motion video. This digital motion video generally is received as a data file over a computer network into computer readable storage, or on a form of computer readable storage. Typically, independently, the computer system also receives (202) a three-dimensional model of a scene related to the digital motion video. This model generally is received as a data file over a computer network into computer readable storage, or on a form of computer readable storage.

Given the digital motion video, the computer system corrects (204) any distortion in the digital motion video, such as distortion caused by the lens of the camera. Any other image processing also may be performed.

The computer system calibrates (206) the corrected digital motion video with the three-dimensional model, based on a location of the camera used to capture the digital motion video within the space represented by the three-dimensional model.

After calibration, the computer system generates (208) the user interface with an image from the digital motion video overlaid on a rendered image from the three-dimensional model, along with controls allowing the position and opacity of the overlay to be controlled. In some implementations, a user may position a display area for the digital motion video over a display area for the rendered three-dimensional model and align them manually. In some implementations, the computer may display them in alignment. The displayed overlay controls allow a user to adjust the opacity of the displayed calibrated image from the digital motion video. In some implementations, the overlay controls include an ability to lock the display areas in position with respect to each other. In some implementations, the overlay controls include an ability to toggle the state of an overlay control module to pass through location inputs to the underlying three-dimensional modeling or animation system.

Given the overlaid display area, the computer system can process (210) further user inputs, such as those that adjust opacity of the overlay or that provide inputs to either the rendering of the three-dimensional model or the display of the digital motion video. For example, locations in the three-dimensional model can be selected, and different operations on and manipulations of the three-dimensional model can be selected and performed based on the input locations. For example, different images from the digital motion video can be displayed.

Having now described the general operation of the computer system with respect to the example implementations of FIGS. 1 and 2, some example graphical user interfaces will now be described in connection with FIGS. 3 through 5.

Figure 3:
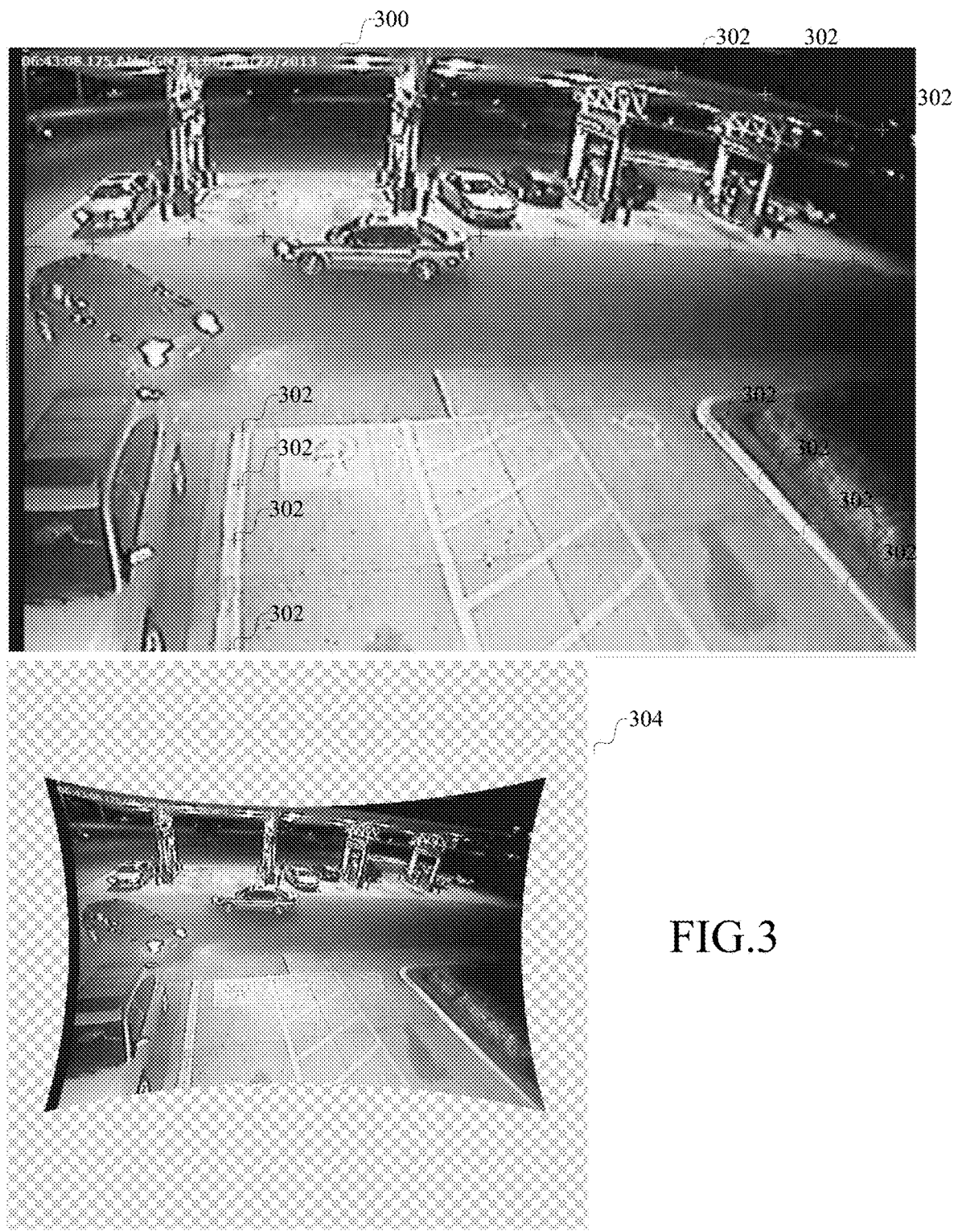
FIG. 3 is an illustration of an example graphical user interface for removing distortion of an image.

FIG. 3 is an illustration of an example graphical user interface for removing distortion of an image.

FIG. 3 illustrates a graphical user interface in which an original image 300 from the digital motion video is displayed. A user specifies input points 302 indicating one or more objects in the image that should represent a straight line. It is preferable to instruct the user to provide input points closer to the edge of the image where there is more distortion. Because the same distortion is applied to each image by the lens, the same correction can be applied to each image. In some implementations, the computer system computes a mathematical transformation to apply to the image such that the specified points form a straight line in a resulting image. Generally, such a transformation is a two-dimensional spatial transform of an image. The resulting image shown at 304 is not rectangular. The user interface can be provided with a control (not shown) allowing the user to crop the image.

As one example for correcting lens distortion, the computer prompts a user to enter plurality of points along a line that appears curved in the image, but which the user knows should be straight. The computer then computes lines between the first point and the second point along the curve, then from the second point to the third point, then from the third point to the fourth point and so forth. The computer then calculates the difference between the angles of each line. Then, two values, labeled K1 and K2, typically called distortion coefficients, for the image are iteratively adjusted over a known range and the angles of the lines between the points is recalculated for each K1 and K2 value. The algorithm selects the final K1 and K2 for the lens distortion values based on the minimum possible difference between the angle of each line. K2 can be set to K1/−10. Example implementations for correction such distortion are found at least in: the ImageMagick library of image processing software from ImageMagick Studio LLC, also described in "Correcting Lens Distortions in Digital Photographs", by Wolfgang Hugemann, 2010, available at https://www.imagemagick.org/Usage/lens/correcting lens distortions.pdr, hereby incorporated by reference; "Correction of Geometric Perceptual Distortions in Pictures", by Denis Zorin and Alan Barr, in Proc. ACM Siggraph 1995, pp. 257-264, hereby incorporated by reference; or "Lens Distortion Correction using a Checkerboard Pattern", by Seok-Han Lee, Jae-Young Lee, and Jong-Soo Choi, in Proceedings of The 7th ACM SIGGRAPH International Conference on Virtual-Reality Continuum and Its Applications in Industry (VRCAI '08), Article No. 44, 2008, hereby incorporated by reference.

Figure 4:
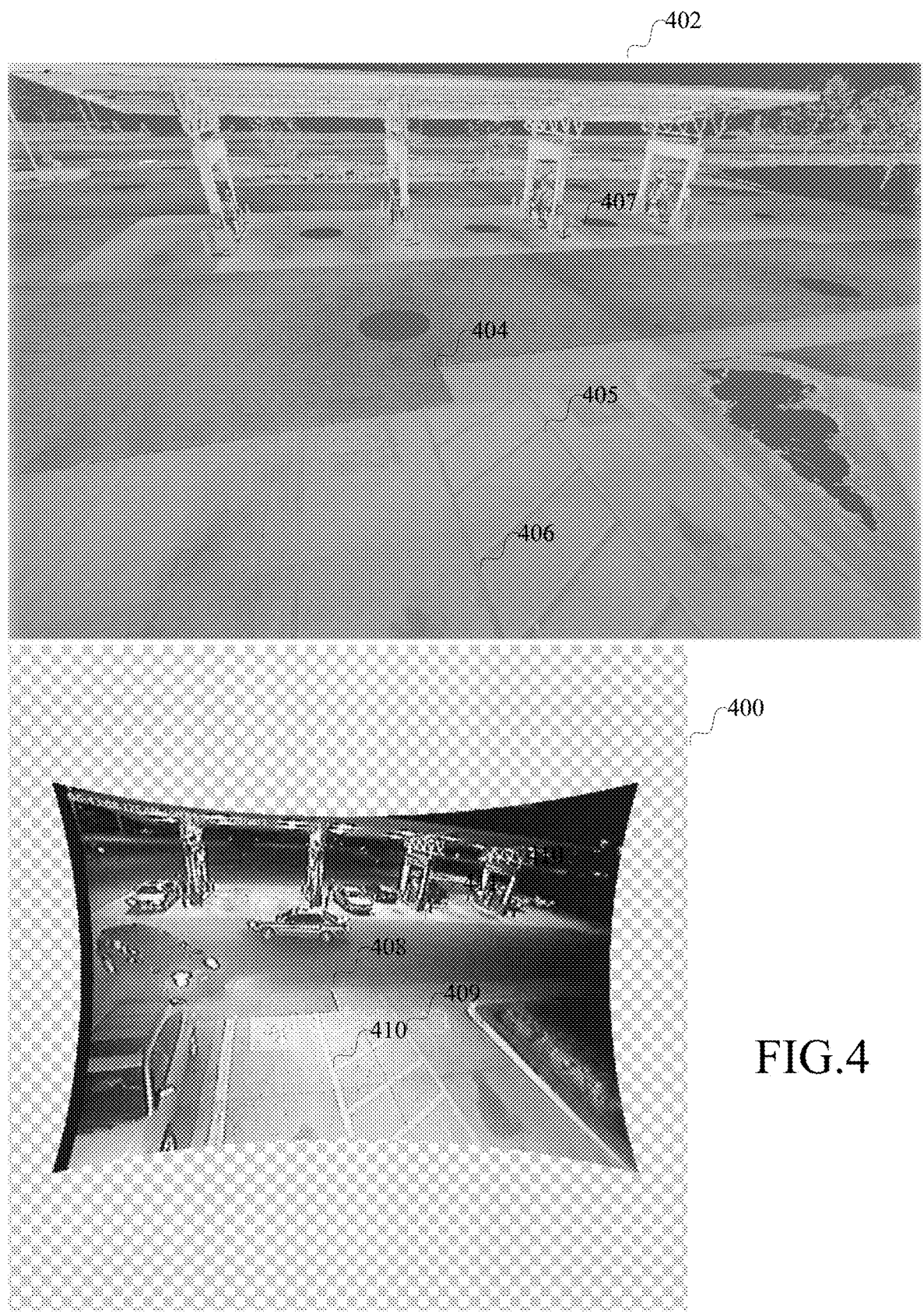
FIG. 4 is an illustration of an example graphical user interface for calibrating an image from motion video from a camera to an image of a rendered three-dimensional model.

FIG. 4 is an illustration of an example graphical user interface for calibrating a three-dimensional model to an image from motion video from a camera.

After the digital motion video is processed to account for distortions, the processed image (400) is presented next to a corresponding rendered image (402) of the three-dimensional model of the scene from approximately the same viewpoint as the camera that provided the digital motion video. The computer system prompts the user to enter correspondence points (examples of which are shown at 404-411) to indicate points in the images that correspond. In some implementations, the correspondence points may be determined automatically by the computer system.

Given this information (the correspondence points), the computer system can calibrate the two images. Generally, at least four points are used, but typically more than four points are used. A two-dimensional transform is computed to transform an image from the digital motion video to match the viewpoint specified in the three-dimensional model. The transform is specified using conventional techniques based on the specified viewpoint and the correspondence points. As an example implementation, using the Open Source Computer Vision Library (OpenCV), a "findHomography" method can be used to determine a transform based on the correspondence points. Given the transform, applying the transform is a geometric operation applied to the corrected image from the camera. As an example implementation, OpenCV has a "perspectiveTransform" method that can be used.

A least-squares approach can be used when interpolating pixels based on weighted color values when applying the transform. As an example implementation, a "rigid transformation" can be used, as described in "Image Deformation Using Moving Least Squares", by Schaefer, S., McPhail, T., and Warren, J., in Proceedings of ACM SIGGRAPH 2006, pages 533-540, hereby incorporated by reference.

FIG. 5 is an illustration of an example graphical user interface overlaying an image from motion video from a camera on a three-dimensional model.

In FIG. 5, an image from the digital motion video is displayed at 500 and overlaid on an image of the rendered three-dimensional model, as indicated at 502. A control panel can be provided at 504 to allow a user to input an opacity parameter, as indicated at 506. In this example the opacity control is shown as a slider. Any other way of inputting a value for the opacity, which generally is a value representing a percentage between 0 percent and 100 percent, or a value between 0 and 1, can be used. An input and control indicating whether the positions of the digital motion video 500 and rendered image 502 are "locked" also can be provided as indicated at 508.

In one implementation, the overlay controls and overlay image can originate from one application and can be two different "windows" of the same application. The window with the overlay image can be placed over the window of a three-dimensional modeling software which displays a rendered image. After positioning and sizing the overlay image over the window with the rendered image, a user can instruct the computer to "lock" those positions and maintain the windows in the same relative position.

Figure 6:
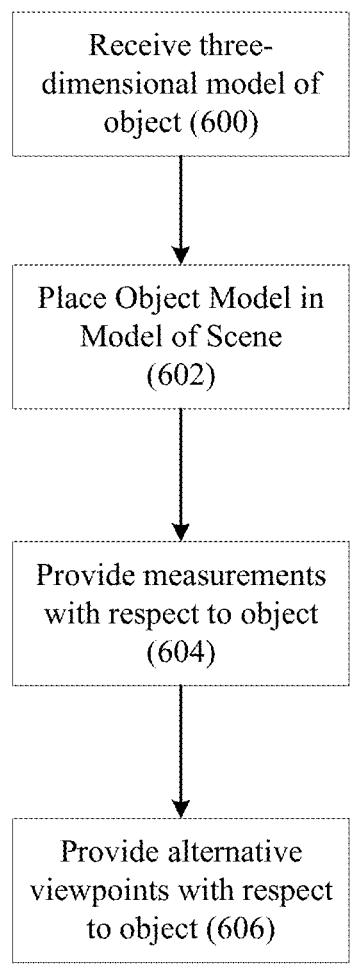
FIG. 6 is a flowchart of operation of an example implementation of a computer system such as in FIG. 1 for adding a three-dimensional model of an object to the three-dimensional model of a scene.

Turning now to FIG. 6, an example flow-of-operation for using the computer system of FIGS. 1 through 5 will now be described. This example is for use of the digital motion video as a guide to insert a three-dimensional model of an object, from the scene as captured in the digital motion video, into the three-dimensional model of the scene.

In FIG. 6, the computer system receives (600) a three-dimensional model of an object, such as a model of a vehicle. In response to user input, the three-dimensional model of the object is placed (602) by the computer system in the three-dimensional model of the scene. In some implementations, the user may manually adjust the position, orientation, and size of the object, using the image of the object from the overlaid digital motion video as a guide. In some implementations, the computer system may automatically or semi-automatically position, orient, and scale the object to match the image of the object in the overlaid digital motion video.

Given the placement of the three-dimensional model of the object into the three-dimensional model of the scene, further manipulations and measurements can be performed using the three-dimensional model. For example, the computer system can provide (604) measurements of size and distance with respect to the additional object. As another example, the computer system can provide (606) other renderings of the three-dimensional model with the object, such as from different viewpoints. For example, if the object is a vehicle, then the computer system can render a view of the three-dimensional model from the viewpoint of an operator of the vehicle.

Figure 8A:
FIGS. 8A-8E are example images of using a calibrated image as a guide to place a three-dimensional object in a three-dimensional model.
Figure 8B:
Figure 8C:
Figure 8D:
Figure 8E:
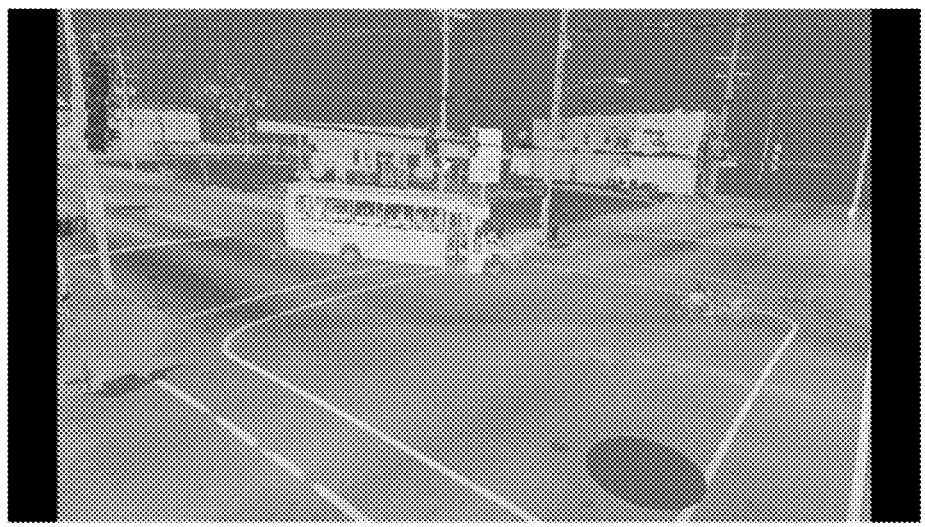

FIGS. 8A-8E are example images of using a calibrated image as a guide to place a three-dimensional object in a three-dimensional model. The first image in FIG. 8A is an example frame from video which was captured at a scene and which has already been calibrated and overlaid on top of a three-dimensional model of the scene. The second image in FIG. 8B illustrates only the three-dimensional model background. In FIG. 8B, the bus that is visible is a three-dimensional object that was placed by the user in the model, using the image of the bus from the video so that the bus in the model is aligned with the bus from the video. Thus, the user places the model of the bus back into the scene within the three-dimensional modelling software. The next two images FIGS. 8C and 8D depict the same scene and three-dimensional model, but for a new position of the bus based on the position of the bus from one frame later in the video sequence. The position of the bus in each frame can be represented as a form of animation of the bus in a three-dimensional animation of the model. The final image in FIG. 8E is a screenshot showing the same scene from a new viewpoint in the three-dimensional model to allow a different view of the position of the bus than provided by the video.

In some implementations, a measurement can be provided with data indicating an estimated accuracy of the measurement. For example, instead of an exact value, a measurement can be represented by a value and a range around that value. The range around a value can be determined based on known sources of error in measurements. For example, in any measurement, there may be an error due to sampling used to create the three-dimensional model, and due to the pixel resolution of the digital motion video, and due to transformations applied to the digital motion video. As an example, in some areas of an image, a pixel of an image may represent one inch of actual distance. Thus, any measurement of an object in that area of the image is accurate only within one inch. Given the known sources of errors, these errors can be accumulated to provide a measure of accuracy associated with any spatial measurement. Some example techniques for computing such measurements are described, for example, in "The reverse projection technique in forensic photogrammetry", by J. Whitnall and F. H. Moffitt, in Non-Topographic Photogrammetry, 2nd ed. (H. Karara, ed.), American Society for Photogrammetry and Remote Sensing, Falls Church, Va., pp. 389-393, 1989, hereby incorporated by reference; or in J. Russ and B. Neal, 2016, The Image Processing Handbook, 7th edition, CRC Press, 13:978-1-4987-4028-9, hereby incorporated by reference.

Figure 9:
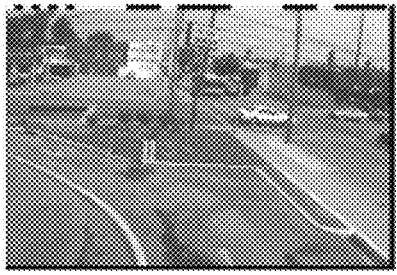
FIG. 9 is an example image of a margin of error report illustrating measurements made within a three-dimensional model using a calibrated image as a guide.
Figure 9:
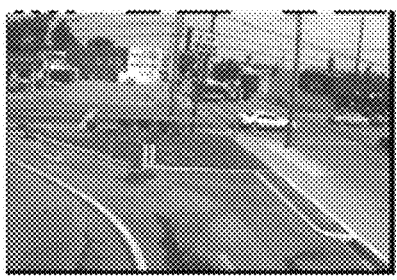
Figure 9:
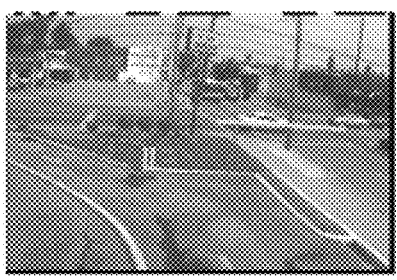
Figure 9:
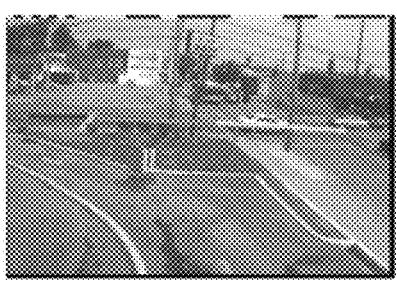

In some implementations, the computer system can output images and data, for example in the form of a report, indicating, within an image, an object of interest, corresponding measurements, and corresponding data about the margin of error for such measurements. As an example, in response to a user selecting two points through an overlaid image, the underlying three-dimensional model may provide coordinates in three dimensions, or a measurement between those coordinates. Information about the scanner accuracy, calibration accuracy, and resolution accuracy can be combined to provide a margin of error for the measurements related to the object of interest. FIG. 9 is an example image of a margin of error report illustrating measurements made within a three-dimensional model using a calibrated image as a guide.

Figure 7:
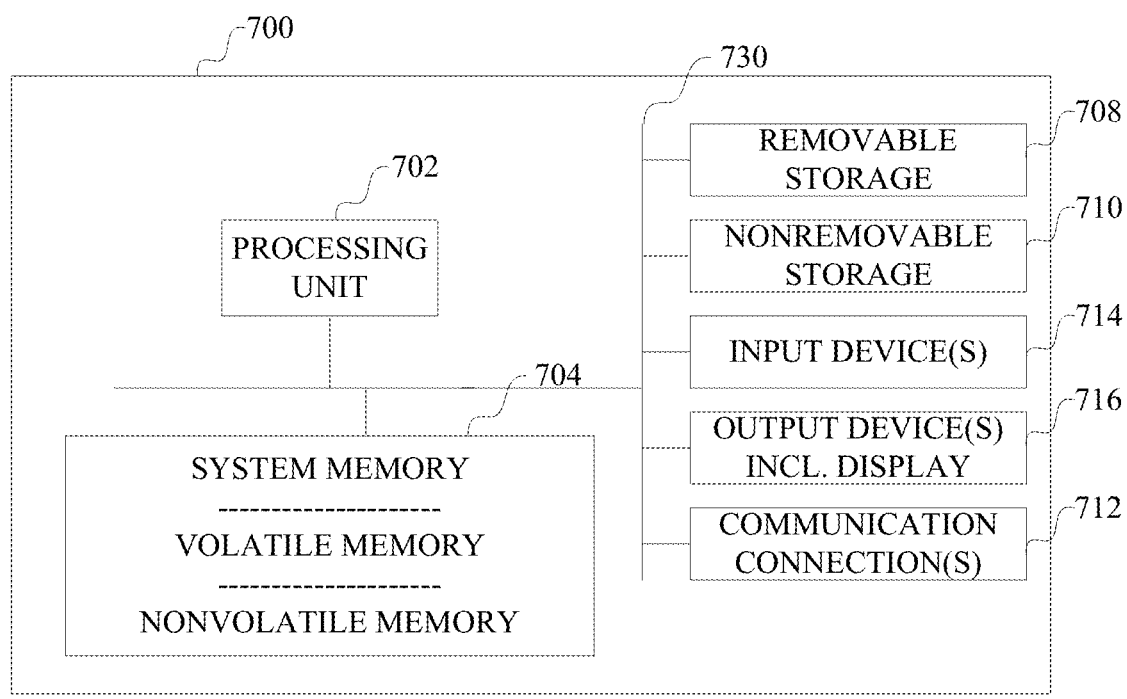
FIG. 7 is a block diagram of an example computer.

Having now described an example implementation, FIG. 7 illustrates an example of a computer with which components of the computer system of the foregoing description can be implemented. This is only one example of a computer and is not intended to suggest any limitation as to the scope of use or functionality of such a computer. The various modules and graphical user interfaces in FIGS. 1 through 6 can be implemented in one or more computer programs executed on one or more such computers as shown in FIG. 7.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 7, a computer 700 includes a processing system comprising at least one processing unit 702 and at least one memory 704. The processing unit 702 can include multiple processing devices; the memory 704 can include multiple memory devices. A processing unit 702 comprises a processor which is logic circuitry which responds to and processes instructions to provide the functions of the computer. A processing device can include one or more processing cores (not shown) that are multiple processors within the same logic circuitry that can operate independently of each other. Generally, one of the processing units in the computer is designated as a primary processor, typically called the central processing unit (CPU). A computer can include coprocessors that perform specialized functions such as a graphical processing unit (GPU).

The memory 704 may include volatile computer storage devices (such as a dynamic or static random-access memory device), and non-volatile computer storage devices (such as a read-only memory or flash memory) or some combination of the two. A nonvolatile computer storage device is a computer storage device whose contents are not lost when power is removed. Other computer storage devices, such as dedicated memory or registers, also can be present in the one or more processors. The computer 700 can include additional computer storage devices (whether removable or non-removable) such as, but not limited to, magnetically-recorded or optically-recorded disks or tape. Such additional computer storage devices are illustrated in FIG. 7 by removable storage device 708 and non-removable storage device 710. Such computer storage devices 708 and 710 typically are nonvolatile storage devices. The various components in FIG. 7 are generally interconnected by an interconnection mechanism, such as one or more buses 730.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 704, removable storage 708 and non-removable storage 710 are all examples of computer storage devices. Computer storage devices and communication media are distinct categories, and both are distinct from signals propagating over communication media.

Computer 700 may also include communications connection(s) 712 that allow the computer to communicate with other devices over a communication medium. Communication media typically transmit computer program instructions, data structures, program modules or other data over a wired or wireless substance by propagating a signal over the substance. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 712 are devices, such as a wired network interface, or wireless network interface, which interface with communication media to transmit data over and receive data from signal propagated over the communication media.

The computer 700 may have various input device(s) 714 such as a pointer device, keyboard, touch-based input device, pen, camera, microphone, sensors, such as accelerometers, thermometers, light sensors and the like, and so on. The computer 700 may have various output device(s) 716 such as a display, speakers, and so on. Such devices are well known in the art and need not be discussed at length here.

The various computer storage devices 708 and 710, communication connections 712, output devices 716 and input devices 714 can be integrated within a housing with the rest of the computer, or can be connected through various input/output interface devices on the computer, in which case the reference numbers 708, 710, 712, 714 and 716 can indicate either the interface for connection to a device or the device itself as the case may be. The various modules, tools, or applications, and data structures and flowcharts of FIGS. 1-6, as well as any operating system, file system and applications on a computer in FIG. 7, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

In one aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer system comprising:
a processing system comprising computer storage and a processing device that executes computer program instructions;
an overlay control module comprising computer program instructions that are executed as a first application by the processing system,
three-dimensional modeling software comprising computer program instructions that are executed as a second application by the processing system, wherein the three-dimensional modeling software enables a user to manipulate a three-dimensional model of a scene, and displays a rendered image of the three-dimensional model on a display;
wherein the overlay control module overlays a calibrated image from digital motion video on the displayed rendered image of the three-dimensional model according to an opacity, wherein the digital motion video originates from a camera that has a view of the scene, from a period of time, and wherein the rendered image of the three-dimensional model is for a view in the three-dimensional model of the scene based on a location of the camera in the scene; and
wherein, in response to inputs from an input device related to locations in the overlaid calibrated image on the display, the processing system provides the inputs to the three-dimensional modeling software displaying the rendered image of the three-dimensional model, whereby the calibrated image displayed by the overlay control module allows the user to use the calibrated image as a guide for providing a spatial location related to the three-dimensional model of the scene to the three-dimensional modeling software,
wherein the processing system includes an operating system that causes the overlay control module to display the calibrated image in a first window based on the opacity, and wherein the operating system passes inputs associated with locations in the first window to the three dimensional modeling software having a second window displayed underneath the first window.

2. The computer system of claim 1, further comprising:
a calibration module comprising computer program instructions that, when executed by the processing system, generate the calibrated image from the digital motion video based on correspondence with the rendered image of the three-dimensional model.

3. The computer system of claim 2, wherein the calibration module generates a two-dimensional transform for calibrating an image from the digital motion video to the rendered image of the three-dimensional model.

4. The computer system of claim 1, wherein the overlay control module generates a graphical user interface on the display enabling a user to provide input to modify the opacity.

5. The computer system of claim 1, further comprising:
an image processing module comprising computer program instructions that, when executed by the processing system, correct spatial distortions in the digital motion video due to the camera, and wherein the calibrated image is generated from corrected digital motion video.

6. The computer system of claim 1, further comprising:
a playback module comprising computer program instructions that, when executed by the processing system, plays back calibrated images from the digital motion video, in response to user inputs; and
wherein the overlay control module overlays the played back calibrated images on the rendered image of the three-dimensional model.

7. The computer system of claim 1, wherein the three-dimensional modeling software initiates an operation based on the spatial location specified through the inputs from the user using the calibrated image as a guide.

8. The computer system of claim 7, wherein the operation includes adding an object to the three-dimensional model of the scene based on the spatial location specified through the inputs from the user using the calibrated image as a guide.

9. The computer system of claim 7, wherein the operation includes a measurement operation wherein, in response to a user selecting two points using the calibrated image as a guide, the three-dimensional modeling software provides a measurement between coordinates corresponding to the selected two points.

10. The computer system of claim 9, wherein the measurement operation includes computing a margin of error.

11. The computer system of claim 10, wherein the margin of error is based on scanner accuracy.

12. The computer system of claim 10, wherein the margin of error is based on calibration accuracy.

13. The computer system of claim 10, wherein the margin of error is based on resolution accuracy.

14. A computer system comprising:
a processing system comprising computer storage and a processing device that executes computer program instructions;
an overlay control module comprising computer program instructions that are executed as a first application by the processing system,
three-dimensional modeling software comprising computer program instructions that are executed as a second application by the processing system, wherein the three-dimensional modeling software enables a user to manipulate a three-dimensional model of a scene, and displays a rendered image of the three-dimensional model on a display;
wherein the overlay control module overlays a calibrated image from digital motion video on the displayed rendered image of the three-dimensional model according to an opacity, wherein the digital motion video originates from a camera that has a view of the scene, from a period of time, and wherein the rendered image of the three-dimensional model is for a view in the three-dimensional model of the scene based on a location of the camera in the scene; and
wherein, in response to inputs from an input device related to locations in the overlaid calibrated image on the display, the processing system provides the inputs to the three-dimensional modeling software displaying the rendered image of the three-dimensional model, whereby the calibrated image displayed by the overlay control module allows the user to use the calibrated image as a guide for providing a spatial location related to the three-dimensional model of the scene to the three-dimensional modeling software, wherein the three-dimensional modeling software initiates an operation based on the spatial location specified through the inputs from the user using the calibrated image as a guide, wherein the operation includes adding an object to the three-dimensional model of the scene based on the spatial location specified through the inputs from the user using the calibrated image as a guide, wherein the operation includes adjusting size, position, or orientation of the added object in the three-dimensional model of the scene based on the spatial location specified through the inputs from the user using the calibrated image as a guide.

15. A computer system comprising:

a processing system comprising computer storage and a processing device that executes computer program instructions;

an overlay control module comprising computer program instructions that are executed as a first application by the processing system, three-dimensional modeling software comprising computer program instructions that are executed as a second application by the processing system, wherein the three-dimensional modeling software enables a user to manipulate a three-dimensional model of a scene, and displays a rendered image of the three-dimensional model on a display;

wherein the overlay control module overlays a calibrated image from digital motion video on the displayed rendered image of the three-dimensional model according to an opacity, wherein the digital motion video originates from a camera that has a view of the scene, from a period of time, and wherein the rendered image of the three-dimensional model is for a view in the three-dimensional model of the scene based on a location of the camera in the scene; and wherein, in response to inputs from an input device related to locations in the overlaid calibrated image on the display, the processing system provides the inputs to the three-dimensional modeling software displaying the rendered image of the three-dimensional model, whereby the calibrated image displayed by the overlay control module allows the user to use the calibrated image as a guide for providing a spatial location related to the three-dimensional model of the scene to the three-dimensional modeling software, wherein the overlay control module has a first state in which inputs received from the input device are processed by the overlay control module, and a second state in which inputs received from the input device and associated with locations in the displayed calibrated image are provided to the second application.

16. The computer system of claim 15, wherein the overlay control module has a setting allowing a user to toggle between the first state and the second state.

17. A computer system comprising:

a processing system comprising computer storage and a processing device that executes computer program instructions;

an overlay control module comprising computer program instructions that are executed as a first application by the processing system, three-dimensional modeling software comprising computer program instructions that are executed as a second application by the processing system, wherein the three-dimensional modeling software enables a user to manipulate a three-dimensional model of a scene, and displays a rendered image of the three-dimensional model on a display;

wherein the overlay control module overlays a calibrated image from digital motion video on the displayed rendered image of the three-dimensional model according to an opacity, wherein the digital motion video originates from a camera that has a view of the scene, from a period of time, and wherein the rendered image of the three-dimensional model is for a view in the three-dimensional model of the scene based on a location of the camera in the scene; and wherein, in response to inputs from an input device related to locations in the overlaid calibrated image on the display, the processing system provides the inputs to the three-dimensional modeling software displaying the rendered image of the three-dimensional model, whereby the calibrated image displayed by the overlay control module allows the user to use the calibrated image as a guide for providing a spatial location related to the three-dimensional model of the scene to the three-dimensional modeling software, wherein the three-dimensional modeling software initiates an operation based on the spatial location specified through the inputs from the user using the calibrated image as a guide, wherein the operation includes a measurement operation wherein, in response to a user selecting two points using the calibrated image as a guide, the three-dimensional modeling software provides a measurement between coordinates corresponding to the selected two points, wherein the measurement operation includes computing a margin of error and generating a report indicating, within an image, an object of interest, corresponding measurements, and corresponding data about the margin of error for such measurements.

* * * * *